United States Patent
Liu et al.

(10) Patent No.: US 12,019,860 B2
(45) Date of Patent: Jun. 25, 2024

(54) PRESENTATION AND CONTROL OF USER INTERACTION WITH AN ARC-SHAPED USER INTERFACE ELEMENT

(71) Applicant: Capital One Services, LLC, McLean, VA (US)

(72) Inventors: Zhe Liu, McLean, VA (US); Oliver Deighton, Vienna, VA (US); Melvin Johnson, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/048,130

(22) Filed: Oct. 20, 2022

(65) Prior Publication Data
US 2023/0057552 A1    Feb. 23, 2023

Related U.S. Application Data

(63) Continuation of application No. 17/097,793, filed on Nov. 13, 2020, now Pat. No. 11,481,101.

(51) Int. Cl.
| | |
|---|---|
| *G06F 3/04847* | (2022.01) |
| *G06F 3/04842* | (2022.01) |
| *G06Q 10/0631* | (2023.01) |
| *G06Q 20/10* | (2012.01) |
| *G06Q 20/22* | (2012.01) |
| *G06Q 20/32* | (2012.01) |

(52) U.S. Cl.
CPC ...... *G06F 3/04847* (2013.01); *G06F 3/04842* (2013.01); *G06Q 10/06312* (2013.01); *G06Q 20/102* (2013.01); *G06Q 20/108* (2013.01); *G06Q 20/2295* (2020.05); *G06Q 20/3223* (2013.01); *G06Q 20/326* (2020.05)

(58) Field of Classification Search
CPC ............ G06F 3/04847; G06F 3/04842; G06Q 10/06312; G06Q 20/102; G06Q 20/108; G06Q 20/2295; G06Q 20/3223; G06Q 20/326
See application file for complete search history.

(56) References Cited

U.S. PATENT DOCUMENTS

| | | |
|---|---|---|
| D307,127 S | 4/1990 | Simons et al. |
| 6,111,573 A | 8/2000 | McComb et al. |

(Continued)

OTHER PUBLICATIONS

Comstock J., "Reports: Google Fit is Coming to iOS," Mar. 16, 2018, 3 pages.

(Continued)

*Primary Examiner* — Justin R. Blaufeld
(74) *Attorney, Agent, or Firm* — Harrity & Harrity, LLP

(57) ABSTRACT

In some implementations, a user device may present, on a user interface, an arc-shaped user interface element. The user device may detect a user interaction that indicates a first point on the arc-shaped user interface element. The user device may present, on the user interface, a first arc portion of the arc. The first arc portion may represent a first amount, of a total amount, to be associated with a first user account. A second arc portion may represent a second amount, of the total amount, associated with the second user account. The user device may transmit, to an account management device, information that identifies the first amount, of the total amount, to be associated with the first user account.

20 Claims, 9 Drawing Sheets

(56) References Cited

U.S. PATENT DOCUMENTS

| | | |
|---|---|---|
| D473,151 S | 4/2003 | Shaland et al. |
| 7,107,268 B1 | 9/2006 | Zawadzki et al. |
| D555,164 S | 11/2007 | Sergio |
| 7,792,748 B1 | 9/2010 | Ebersole et al. |
| 7,982,630 B2 | 7/2011 | Kim |
| 8,170,933 B1 | 5/2012 | Cameron et al. |
| D676,060 S | 2/2013 | Frost et al. |
| D676,457 S | 2/2013 | Frost et al. |
| 8,438,091 B1 | 5/2013 | Berman |
| D697,518 S | 1/2014 | Thomsen et al. |
| D709,913 S | 7/2014 | Hurd |
| D748,126 S | 1/2016 | Sarukkai et al. |
| D759,077 S | 6/2016 | Bergmann et al. |
| D759,079 S | 6/2016 | Carlton et al. |
| D760,246 S | 6/2016 | Birks et al. |
| D761,297 S | 7/2016 | Eder |
| D775,658 S | 1/2017 | Luo et al. |
| 9,606,643 B2 | 3/2017 | Aguera-Arcas et al. |
| D798,311 S | 9/2017 | Golden et al. |
| D809,535 S | 2/2018 | Park et al. |
| D811,425 S | 2/2018 | Olsen et al. |
| D818,487 S | 5/2018 | Eder |
| D824,417 S | 7/2018 | Narinedhat |
| D854,032 S | 7/2019 | Jones et al. |
| 10,402,896 B1 | 9/2019 | Lopez et al. |
| D864,224 S | 10/2019 | Subrahmaniyan et al. |
| 10,540,712 B2* | 1/2020 | Ley ................ G06Q 20/10 |
| 10,564,990 B1 | 2/2020 | Kapulkin et al. |
| D877,171 S | 3/2020 | Poindexter et al. |
| D888,099 S | 6/2020 | Brinker et al. |
| D889,490 S | 7/2020 | Meis et al. |
| 10,713,730 B2* | 7/2020 | Caldwell ............ G06Q 40/128 |
| 10,783,576 B1* | 9/2020 | Van Os ............ G06Q 20/3227 |
| D898,750 S | 10/2020 | Lu |
| D905,074 S | 12/2020 | Lin et al. |
| 10,891,037 B1* | 1/2021 | Mackrell ................. G07G 1/01 |
| D928,195 S | 8/2021 | Wassell et al. |
| 11,079,919 B1 | 8/2021 | Soccorsy |
| D932,511 S | 10/2021 | Alt et al. |
| D936,075 S | 11/2021 | Algarra |
| D944,821 S | 3/2022 | Martinez |
| D947,870 S | 4/2022 | Zimmerman et al. |
| D956,773 S | 7/2022 | Adams et al. |
| D958,162 S | 7/2022 | Kiikkala et al. |
| 11,481,101 B2* | 10/2022 | Liu ................ G06Q 20/3676 |
| D968,452 S | 11/2022 | Nilssen et al. |
| D971,962 S | 12/2022 | Eder |
| D973,708 S | 12/2022 | Lewis et al. |
| D978,875 S | 2/2023 | Losch et al. |
| D982,594 S | 4/2023 | Kim et al. |
| D982,601 S | 4/2023 | Martinez |
| D983,219 S | 4/2023 | Mühlsteiger et al. |
| D985,597 S | 5/2023 | Liu |
| D985,598 S | 5/2023 | Liu |
| D994,707 S | 8/2023 | Jameson et al. |
| D995,541 S | 8/2023 | Despineux et al. |
| D1,003,311 S | 10/2023 | Foubert et al. |
| D1,005,303 S | 11/2023 | Bhattacharyya et al. |
| D1,005,306 S | 11/2023 | Smith |
| D1,006,820 S | 12/2023 | Li et al. |
| D1,008,283 S | 12/2023 | Brown et al. |
| D1,009,897 S | 1/2024 | Hinchliffe |
| 2003/0137541 A1 | 7/2003 | Massengale et al. |
| 2003/0210279 A1 | 11/2003 | Masuda |
| 2005/0222881 A1 | 10/2005 | Booker |
| 2005/0229110 A1 | 10/2005 | Gegner et al. |
| 2006/0236264 A1 | 10/2006 | Cain et al. |
| 2007/0136679 A1 | 6/2007 | Yang |
| 2007/0149252 A1 | 6/2007 | Jobs et al. |
| 2007/0260532 A1 | 11/2007 | Blake, III |
| 2008/0309475 A1 | 12/2008 | Kuno et al. |
| 2009/0204538 A1* | 8/2009 | Ley ................ G06Q 20/10 |
| | | 715/833 |
| 2009/0276719 A1 | 11/2009 | Pardehpoosh |
| 2010/0031157 A1* | 2/2010 | Neer ................ G06Q 10/06 |
| | | 715/738 |
| 2010/0153242 A1 | 6/2010 | Preston et al. |
| 2010/0268629 A1 | 10/2010 | Ross et al. |
| 2011/0099063 A1 | 4/2011 | Clemmons |
| 2012/0066088 A1* | 3/2012 | Murset ............ G06Q 30/0633 |
| | | 708/670 |
| 2012/0084168 A1 | 4/2012 | Adair et al. |
| 2012/0110452 A1 | 5/2012 | Hiipakka et al. |
| 2012/0130869 A1 | 5/2012 | Shergill et al. |
| 2012/0130870 A1 | 5/2012 | Shergill et al. |
| 2012/0215464 A1 | 8/2012 | Daubney |
| 2013/0055136 A1 | 2/2013 | Aaron et al. |
| 2013/0103580 A1 | 4/2013 | Ventura |
| 2013/0282512 A1 | 10/2013 | White |
| 2013/0345978 A1 | 12/2013 | Lush et al. |
| 2014/0006050 A1* | 1/2014 | Feinschreiber .... G06Q 10/1057 |
| | | 705/2 |
| 2014/0037107 A1 | 2/2014 | Marino, Jr. et al. |
| 2014/0245161 A1 | 8/2014 | Yuen et al. |
| 2014/0267290 A1* | 9/2014 | Hao ................ G06Q 30/0201 |
| | | 345/440 |
| 2014/0298235 A1* | 10/2014 | Caldwell ................ G06Q 40/12 |
| | | 715/772 |
| 2015/0356160 A1 | 12/2015 | Berwick et al. |
| 2016/0058336 A1* | 3/2016 | Blahnik ................ A61B 5/1118 |
| | | 600/595 |
| 2018/0015284 A1 | 1/2018 | Coleman et al. |
| 2018/0081528 A1 | 3/2018 | Chan et al. |
| 2018/0096036 A1* | 4/2018 | Haldenby ............ H04L 67/535 |
| 2018/0335928 A1* | 11/2018 | Van Os ................ G06Q 20/204 |
| 2018/0336543 A1* | 11/2018 | Van Os ............ G06Q 20/3223 |
| 2019/0339860 A1 | 11/2019 | Chen et al. |
| 2020/0111103 A1* | 4/2020 | Kalaboukis .......... G06Q 20/326 |

OTHER PUBLICATIONS

Extended European Search Report for Application No. EP21207681, dated Apr. 4, 2022, 9 pages.

"Google Fit Places Improved User Interface with Heart Points and Step Counter at the Forefront," Apr. 7, 2020, 3 pages.

Gurel D., "Google Fit is now on iOS," Apr. 24, 2019, 5 pages.

Stables J., "Apple Watch: Activity and Workout App Explored and Explained," Dec. 24, 2019, 10 pages.

Turner, A., "The Complete Guide to the iPhone's Bedtime Mode," Jul. 17, 2020, 5 pages.

Co-pending U.S. Appl. No. 29/758,329, inventor LIU; Zhe, filed on Nov. 13, 2020.

Josh Klpa., "Minimalist Gauges," Nov. 2012, 2 pages. Retrieved from the Internet [https://dribbble.com/shots/797853-Minimalist-Gauges].

* cited by examiner

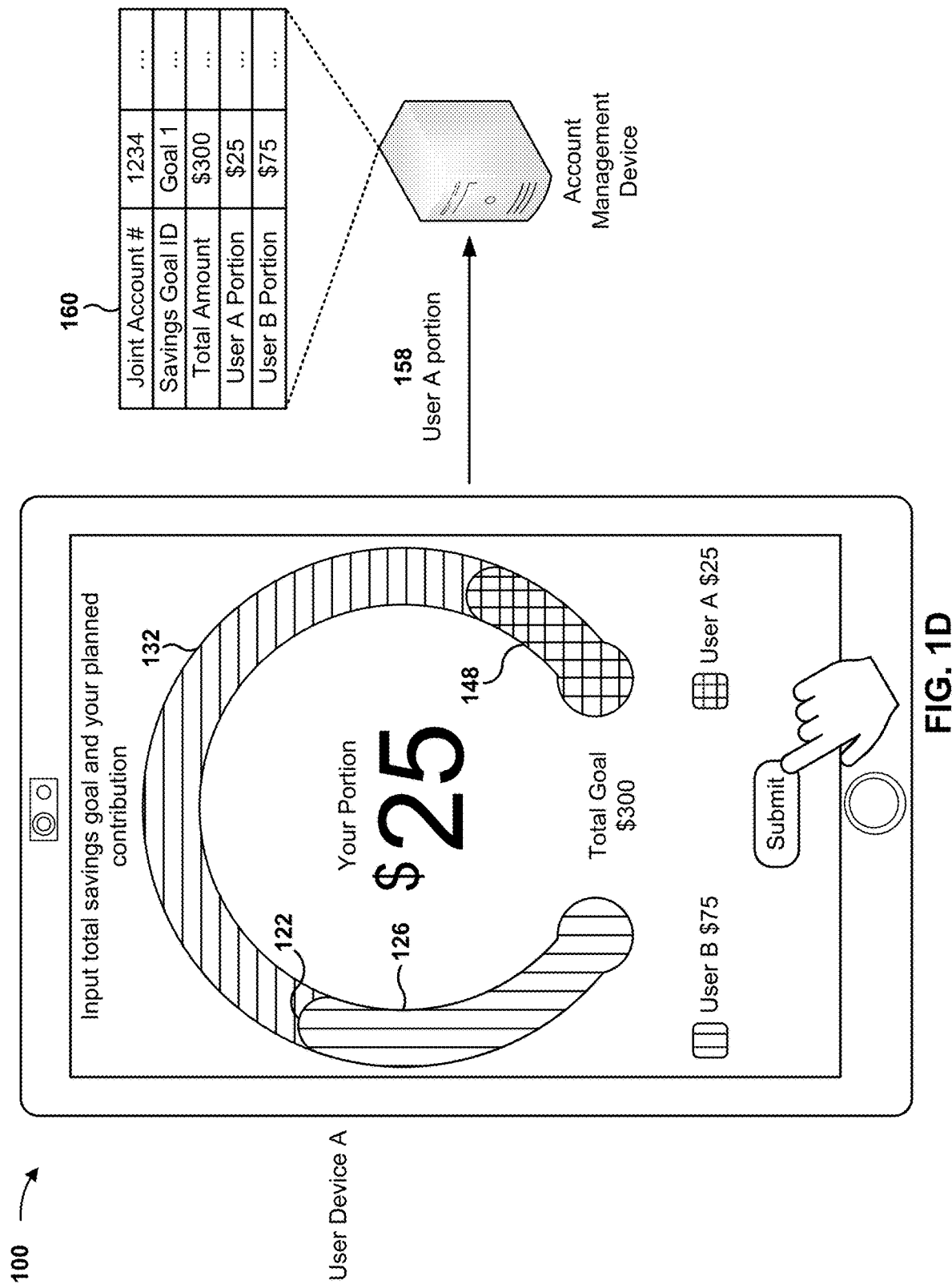

PRESENTATION AND CONTROL OF USER INTERACTION WITH AN ARC-SHAPED USER INTERFACE ELEMENT

RELATED APPLICATION

This application is a continuation of U.S. patent application Ser. No. 17/097,793, filed Nov. 13, 2020, which is incorporated herein by reference in its entirety.

BACKGROUND

A display of a user device may display a user interface (e.g., a graphical user interface). A user interface may permit interactions between a user of the user device and the user device. In some cases, the user may interact with the user interface to operate and/or control the user device to produce a desired result. For example, the user may interact with the user interface of the user device to cause the user device to perform an action. Additionally, the user interface may provide information to the user.

SUMMARY

In some implementations, a method for presenting an arc-shaped user interface element includes presenting, on a user interface of a user device, an arc-shaped user interface element that includes a first end, a second end, and an arc spanning from the first end to the second end, wherein the arc represents a total amount, and wherein the user interface is associated with a first user account; detecting, by the user device, a user interaction that indicates a first point on the arc-shaped user interface element; presenting, on the user interface and based on the user interaction, a first arc portion of the arc, spanning from the first end to the first point, in a different visual manner than one or more other arc portions of the arc, wherein the first arc portion represents a first amount, of the total amount, to be associated with the first user account, wherein the one or more other arc portions includes a second arc portion of the arc, spanning from the second end to a second point associated with a second user account, that represents a second amount, of the total amount, associated with the second user account; and transmitting, by the user device and to an account management device, information that identifies the first amount, of the total amount, to be associated with the first user account.

In some implementations, a non-transitory computer-readable medium storing a set of instructions includes one or more instructions that, when executed by one or more processors of a user device, cause the user device to present, on a user interface associated with a first user account, an arc-shaped element that includes a first end, a second end, and an arc spanning from the first end to the second end, wherein the arc represents a joint pledged contribution amount; detect a user interaction that indicates a first area on the arc-shaped element; present, on the user interface and based on the user interaction, a first arc portion, of the arc, spanning from the first end to the first area, wherein the first arc portion represents a first pledged contribution amount, of the joint pledged contribution amount, to be associated with the first user account, wherein the arc includes a second arc portion, spanning from the second end to a second area associated with a second user account, that represents a second pledged contribution amount, of the joint pledged contribution amount, associated with the second user account; and transmit, to an account management device, information that identifies the first pledged contribution amount to be associated with the first user account.

In some implementations, a user device includes a memory and one or more processors, communicatively coupled to the memory, configured to present, on a user interface associated with a first user account, an arc-shaped element that includes a first end, a second end, and an arc spanning from the first end to the second end, wherein the arc represents a joint amount associated with the first user account and a second user account; detect a user interaction, with the user device, that indicates a first part of the arc-shaped element; present, on the user interface and based on the user interaction, a first arc portion, of the arc, spanning from the first end to the first part, wherein the first arc portion represents a first pledged amount, of the joint amount, to be associated with the first user account, wherein the arc includes a second arc portion, spanning from the second end to a second part, of the arc-shaped element, associated with the second user account, wherein the second arc portion represents a second pledged amount, of the joint amount, associated with the second user account; and transmit, to another device, information that identifies the first pledged amount to be associated with the first user account.

BRIEF DESCRIPTION OF THE DRAWINGS

FIGS. 1A-1F are diagrams of an example implementation relating to presentation and control of user interaction with an arc-shaped user interface element.

DETAILED DESCRIPTION

Figure 1A:
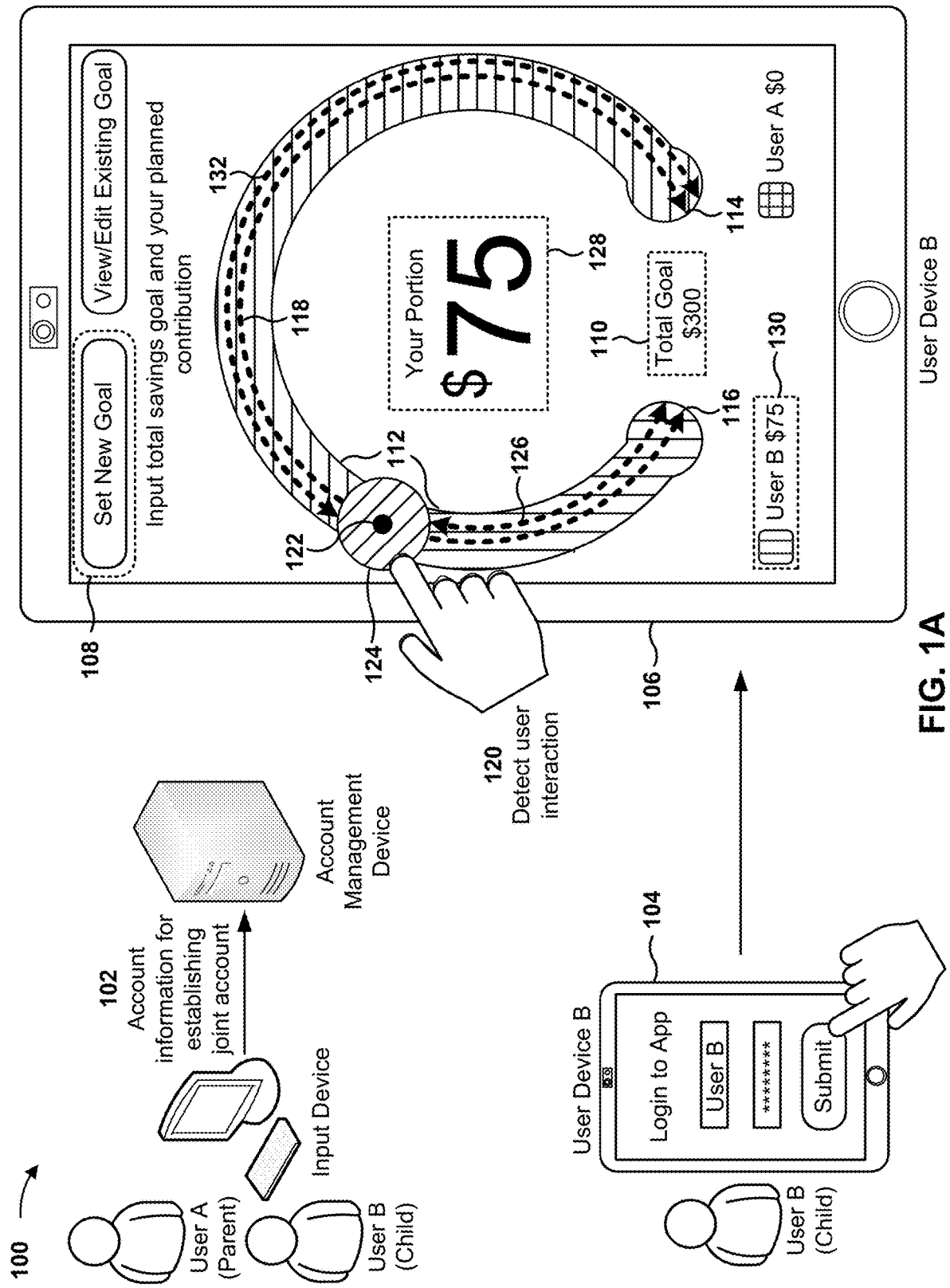

The following detailed description of example implementations refers to the accompanying drawings. The same reference numbers in different drawings may identify the same or similar elements.

Some activities involve two parties that make a collaborative effort to reach a shared goal. For example, parties, such as a parent and a child, a couple, or business partners, may make contributions to a shared monetary savings goal. However, in some cases, the parties may become confused or have disagreements regarding the respective contributions of the parties, and the parties may have difficulty tracking the progress toward the shared goal. Accordingly, a user interface (UI) that allows each party to pledge individual contributions to the shared goal and track the progress of each party toward the shared goal on respective user devices may be beneficial. However, existing techniques for visualizing monetary savings and/or investment goals on a UI are not well suited for multiple users that make contributions to a shared goal. It is desirable for a UI to provide user-friendly way for to visualize and edit the individually pledged contributions of each party, as well as the shared goal.

Some implementations described herein enable a user device to present, on a UI, an arc-shaped UI element that visually indicates individually pledged contributions of two users, as well as the progress of the users toward a shared goal. For example, in some implementations, the arc-shaped UI element includes a first end, a second end, and an arc spanning from the first end to the second end. The arc may represent a total amount of the shared goal. A first arc portion spanning from the first end to a first point on the arc-shaped UI element may represent a first amount to be associated with a first user account, and a second arc portion spanning from the second end to a second point on the arc-shaped UI element may represent a second amount to be associated with a second user account. The user device may present, on the UI, the first arc portion and the second arc portion in different visual manners from each other and from one or more other arc portions of the arc. This provides a clear, cohesive, and user-friendly visualization of the individually pledged contributions of the two users, as well as the progress toward the total amount of the shared goal.

In some implementations described herein, the user device may detect user interaction by the first user that indicates and/or edits the first point on the arc-shaped UI element or user interaction by the second user that indicates and/or edits the second point on the arc-shaped UI element. The user device may present, on the UI, the first arc portion and/or the second arc portion based on the user interaction. This provides the UI with user-friendly controls that allow the users to set and edit the individually pledged contributions while tracking progress toward the total amount of the shared goal. As a result, the user device provides a UI that provides user-friendly visualization and editing of the individually pledged contributions of the users and the progress of the users toward the shared goal. Furthermore, users of different user devices, which may be remote from one another, can receive updates regarding updated pledges and/or contributions of another user.

FIGS. 1A-1F are diagrams of an example 100 associated with presentation and control of user interaction with an arc-shaped UI element. As shown in FIGS. 1A-1F, example 100 includes user devices, an account management device, and an input device. These devices are described in more detail in connection with FIGS. 2 and 3.

As shown in FIG. 1A, and by reference number 102, the input device may transmit, to the account management device, account information for establishing a joint account for user A and user B. User A and/or user B may input the account information to the input device via an input component of the input device. The account information may be associated with a joint account for user A and user B to make contributions toward a shared goal. In some implementations, the joint account may be a joint account for user A and user B to make monetary contributions toward a monetary savings goal. As shown in example 100, in some cases, user A may be a parent and user B may be a child. User A and user B may establish a joint account to manage one or more monetary saving goals for user B, to which user A may contribute.

The account information may include a respective user credential for each user. For example, the user credential for a user may include a username and a password associated with that user. In some cases, the user credential for a user may also include dual authentication information, such as a telephone number or email address to be used for dual authentication of the user. In some implementations, the account information may also include contact information, such as an email address, a telephone number, and/or an address, among other examples, for each user. In some implementations, the account information associated with a respective financial account, such as a checking account, a savings account, or a credit card account, for each user. The account management device may receive the account information from the input device, store the account information, and create the joint account for user A and user B.

As further shown in FIG. 1A, and by reference number 104, user B may login to an application relating to the joint account on user device B. For example, user B may input the user credential associated with user B to user device B. User device B may transmit the user credential associated with user B to the account management device for authentication. The account management device may verify the user credential based on the user credential associated with user B in the stored account information.

As further shown in FIG. 1A, and by reference number 106, user device B may present a UI via a display of device B (e.g., in a web browser or other application). The UI may be associated with a user account of user B. In some implementations, the account management device, based on verifying the user credential associated with user B, may transmit UI configuration information to user device B, and the UI configuration information may cause user device B to present the UI. As shown by reference number 108, the UI may include a "Set New Goal" mode or UI, in which user B may input a total savings goal and a pledged contribution amount, for user B, via the UI. For example, the UI may enter the "Set New Goal" mode based on user device B detecting a user selection of a selectable UI element of the UI. The UI may present a fillable field for user B to input a total amount for the savings goal. The total amount for the savings goal may be the joint pledged contribution amount for user A and user B. As shown by reference number 110, the UI may include a field that presents the total amount for the savings goal. For example, in FIG. 1A, the total amount is set to $300.

As further shown, user device B may present, on the UI, an arc-shaped UI element 112 that includes a first end 114, a second end 116, and an arc 118 spanning from the first end 114 to the second end 116. The arc 118 may represent the total amount for the joint contribution of user A and user B. The arc shaped UI element 112 may also be referred to herein an "arc-shaped element." In some implementations, the arc-shaped element may be substantially horseshoe shaped, as shown in FIG. 1A. For example, the arc-shaped element may be shaped like a horseshoe, a curve, a rounded curve, a portion of a circle, a portion of an ellipse, a portion of an oval, an arc (e.g., an arc of a circle, an arc of an ellipse, or an arc of an oval), an arch, or the like.

As further shown in FIG. 1A, and by reference number 120, user device B may detect a user interaction that indicates a point 122 on the arc-shaped element. As used herein, the indicated point 122 may be a point on the arc-shaped element, an area on the arc-shaped element, or a part of the arc-shaped element. In some implementations, user device B may detect user interaction with a slidable UI element 124, presented in or on the arc-shaped element in the UI, to slide the slidable UI element 124 to the indicated point 122 on the arc-shaped element. An arc portion 126 spanning from the second end 116 to the indicated point 122 may represent a pledged contribution amount for user B. User device B may determine the amount of the pledged contribution for user B based on the length of the arc portion 126 spanning from the second end 116 to the indicated point 122 and the total length of the arc 118 spanning from the first end 114 to the second end 116. For example, user device B may determine the amount of the pledged contribution for user B such that the ratio of the pledged contribution for user B to the total amount of the joint contribution is equal to the ratio of the length of the arc portion 126 to the total length of the arc 118.

User device B may present the pledged contribution for user B in one or more fields on the UI. As shown by reference number 128, the UI may present the pledged amount for user B in a field that shows the pledged amount for the user that is logged in and for which the UI is being displayed (e.g., user B in FIG. 1A). Additionally, or alternatively, as shown by reference number 130, the UI may include a field that shows the pledged contribution for user B and is not dependent on the user that is logged in and for which the UI is being displayed. In the example of FIG. 1A, the pledged amount for user B is $75 of the total goal of $300. In some implementations, user device B may update the field(s) showing the pledged amount for user B as the user interaction indicating the point 122 on the arc-shaped element is detected to allow user B to select a desired pledged contribution. For example, user B may slide the slidable UI element 124 away from the second end 116 (e.g., clockwise in FIG. 1A) along the arc 118 to increase the amount of the pledged contribution, or user B may slide the slidable UI element 124 towards the second end 116 (e.g., counter-clockwise in FIG. 1A) along the arc 118 to decrease the amount of the pledged contribution. In this case, user device B may update the field(s) showing the pledged contribution for user B to show the amount change as user B slides the slidable element 126 along the arc 118.

Based on the user interaction indicating the point 122 on the arc-shaped element, user device B may present the arc portion 126 representing the pledged contribution for user B on the UI in a different visual manner than one or more other arc portions (e.g., a differential arc portion 132, described below) of the arc-shaped element. For example, user device B may present the arc portion representing the pledged contribution for user B on the UI using a particular visual attribute, such as a color, a fill pattern, or a shading, that is different from visual attributes used for other arc portions. Other arc portions on the arc-shaped element may include, for example, an arc portion representing a pledged contribution of user A and/or a differential arc portion 132 representing a difference between the total amount of the goal and the combined pledged contributions of user A and user B. In the example of FIG. 1A, the arc-shaped element does not yet include an arc portion representing a pledged contribution for user A. Accordingly, the differential arc portion 132 in FIG. 1A includes a remaining portion of the arc other than the arc portion representing the pledged contribution for user B. In some implementations, an arc portion representing the pledged contribution for user A may not be editable via user interaction when the UI is associated with the user account of user B (e.g., when user B is logged in).

Figure 1B:
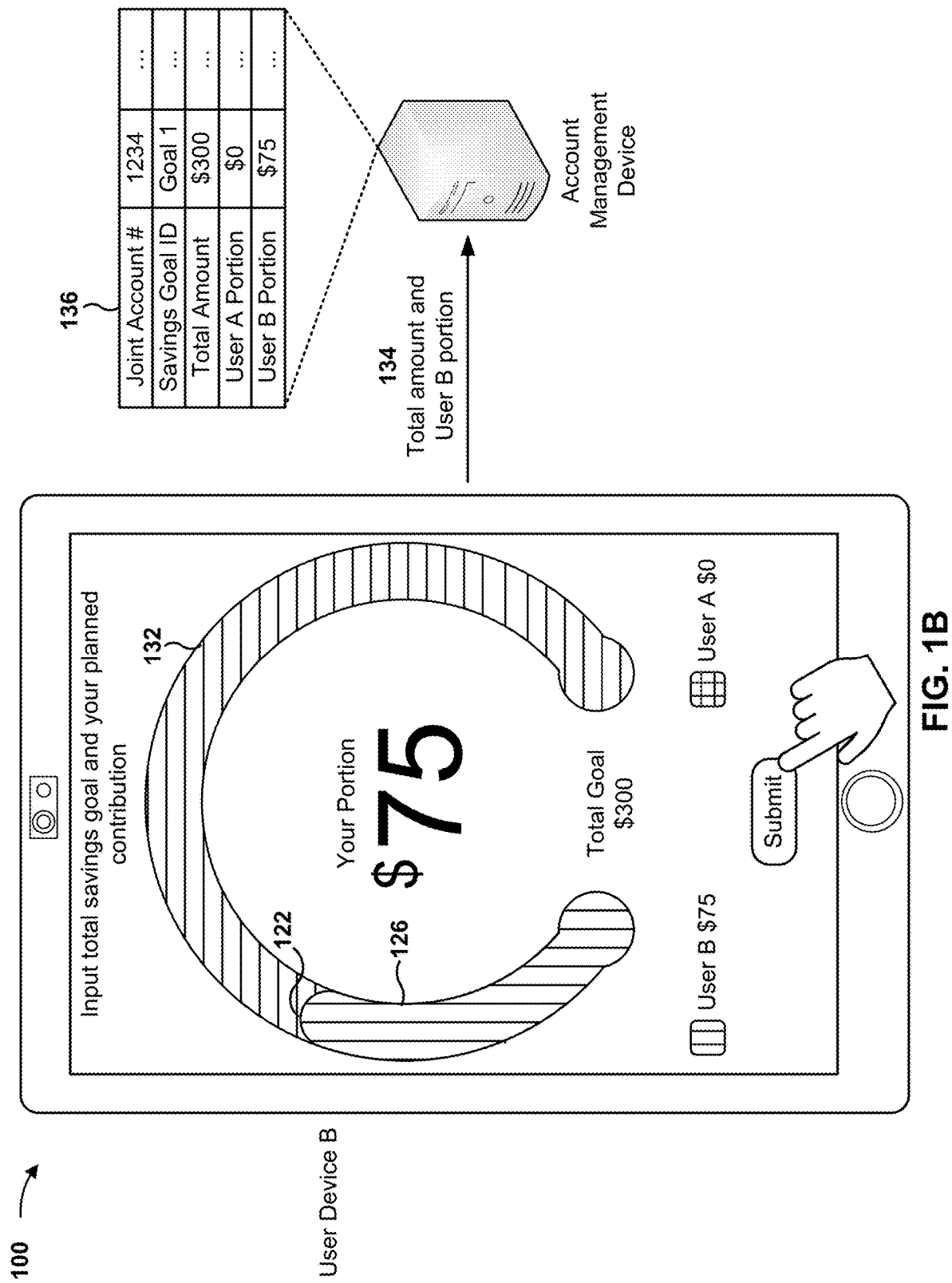

In some implementations, the slidable UI element 126 may only appear on the UI when a user interaction with the UI and/or the arc-shaped element is detected, and may disappear from the UI when the user interaction with the UI and/or the arc-shaped element ends. An example of the UI after the slidable UI element disappears (or is hidden or removed from the UI) is shown in FIG. 1B. Additionally, or alternatively, the slidable UI element 126 may be displayed on the UI until the user finalized and/or submits their contribution.

As further shown in FIG. 1B, and by reference number 134, user device B may transmit, to the account management device, information that identifies the total amount for the goal and the pledged contribution amount for user B. For example, user device B may transmit the information to the account management device based on detecting a user interaction with a UI element on the UI. As shown by reference number 136, the account management device may store the information that identifies the total amount for the goal and the pledged contribution amount for user B in a data structure. For example, the account management device may store, in the data structure, an account number (or other account identifier) associated with the joint account for user A and user B (e.g., "1234" in FIG. 1B), a savings goal identifier (ID) associated with the particular savings goal for user A and user B (e.g., "Goal 1" in FIG. 1B), information identifying the total amount for the goal (e.g., $300 in FIG. 1B), information identifying the pledged contribution for user A (e.g., $0 in FIG. 1B), and information identifying the pledged contribution for user B (e.g., $75 in FIG. 1B).

Figure 1C:
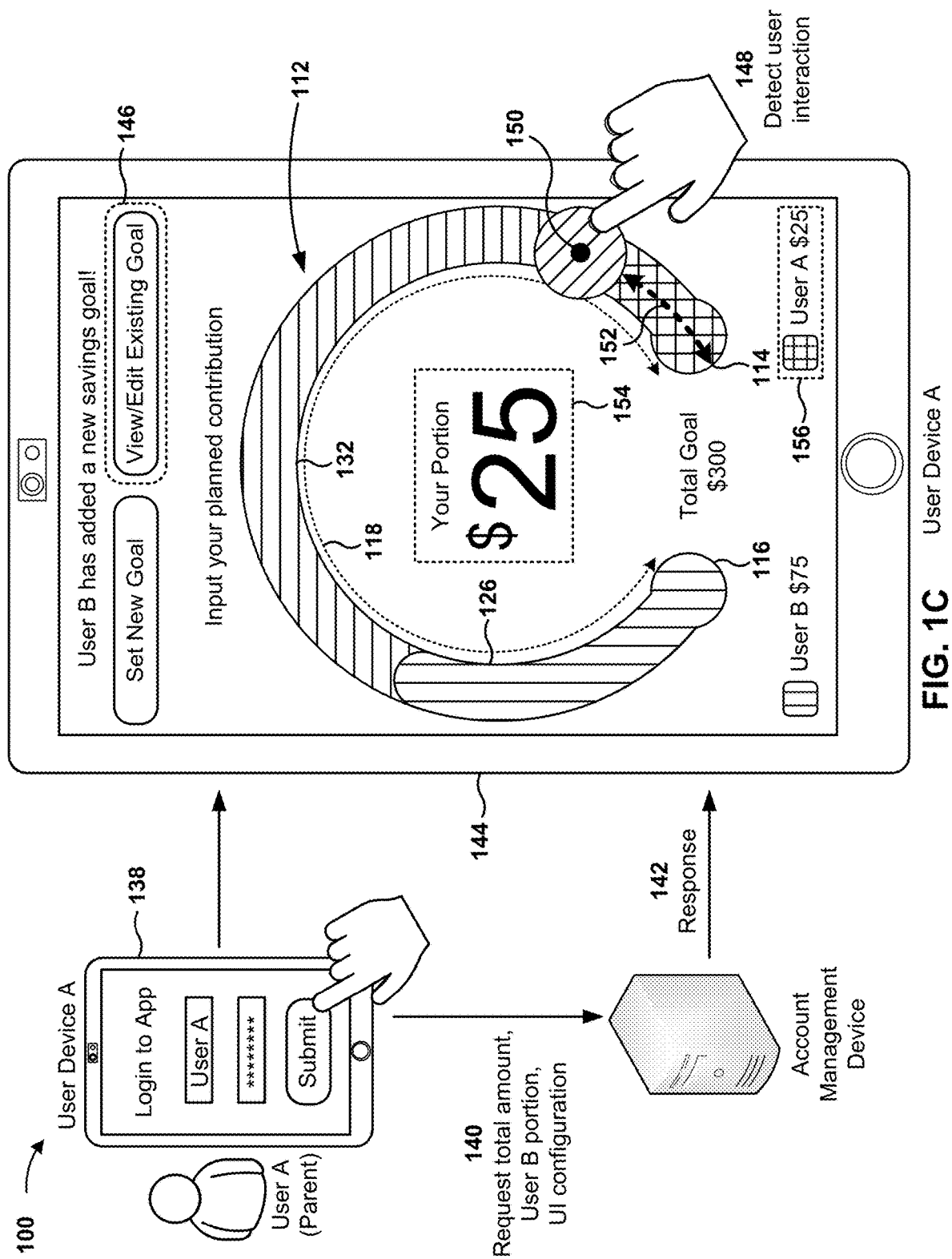

As shown in FIG. 1C, and by reference number 138, user A may login to the application relating to the joint account on user device A. For example, user A may input the user credential associated with user A to user device A. User device A may transmit the user credential associated with user A to the account management device for authentication. The account management device may verify the user credential based on the user credential associated with user A in the stored account information. In some implementations, user device A may be a different user device from user device B. In some implementations, user device A may be the same user device as user device B.

As further shown in FIG. 1C, and by reference number 140, user device A may transmit, to the account management device, a request for information identifying the total amount of the joint contribution goal, information identifying the pledged contribution amount for user B, and/or UI configuration information. As shown by reference number 142, the account management device may transmit, to user device A, a response including the information identifying the total amount of the joint contribution goal, the information identifying the pledged contribution amount for user B, and/or the UI configuration information.

As further shown in FIG. 1C, and by reference number 144, user device A may present a UI via a display of device A (e.g., in a web browser or other application). The UI may be associated with a user account of user A. In some implementations, the UI configuration information received from the account management device may cause user device A to present the UI. The UI may include the arc-shaped element 112 described above in connection with the UI presented on user device B. As shown by reference number 146, the UI may include a "View/Edit Existing Goal" mode or UI, in which the UI presents the arc-shaped element 112 that visually indicates the total amount of the goal and the pledged contribution amount for user B. In the "View/Edit Existing Goal" mode, user A may input a pledged contribution amount via the UI. Additionally, or alternatively, user A may edit the total amount of the goal. In some implementations, the UI may enter the "View/Edit Existing Goal" mode based on user device A detecting a user selection of a selectable UI element in the UI. User device A may present, on the UI, the total amount for the goal and the pledged contribution amount for user B based on the information identifying the total amount for the goal and the pledged contribution amount for user B received from the account management device.

As further shown in FIG. 1C, and by reference number 148, user device A may detect a user interaction that indicates a point 150 on the arc-shaped element 112. As used herein, the indicated point 150 may be a point on the arc-shaped element, an area on the arc-shaped element, or a part of the arc-shaped element. In some implementations, user device A may detect user interaction with a slidable UI element, presented in or on the arc-shaped element in the UI, as described above in connection with user device B. The point 150 indicated by the user interaction detected by user device A may be referred to herein as the "first point." The point 122 that is indicated by the user interaction detected by user device B, as described above in connection with FIG. 1A, may be referred to herein as the "second point." As further shown, an arc portion 152 spanning from the first end 114 to the first point 150 may represent the pledged contribution amount for user A. The arc portion 152 that represents the pledged contribution amount for user A may be referred to herein as the "first arc portion." The arc portion 126 that represents the pledged contribution amount for user B, as described above in connection with FIG. 1A, may be referred to herein as the "second arc portion." User device A may determine the amount of the pledged contribution for user A based on the length of the first arc portion 152 and the total length of the arc 118 spanning from the first end 114 to the second end 116. For example, user device A may determine the amount of the pledged contribution for user A such that the ratio of the pledged contribution for user A to the total amount of the joint contribution is equal to the ratio of the length of the first arc portion 152 to the total length of the arc 118.

User device A may present the pledged contribution amount for user A in one or more fields on the UI. As shown by reference number 154, the UI may present the pledged amount for user A in a field that shows the pledged amount for the user that is logged in and for which the UI is being displayed (e.g., user A in FIG. 1C). Additionally, or alternatively, as shown by reference number 156, the UI may include a field that shows the pledged contribution for user A and is not dependent on the user that is logged in and for which the UI is being displayed. In the example of FIG. 1C, the pledged amount for user A is $25 of the total goal of $300. In some implementations, user device A may update the field(s) showing the pledged amount for user A as the user interaction indicating the first point 150 on the arc-shaped element 112 is detected to allow user A to select a desired pledged contribution amount. For example, user A may slide the slidable UI element away from the first end 114 (e.g., counter-clockwise in FIG. 1C) along the arc 118 to increase the amount of the pledged contribution, or user A may slide the slidable UI element towards the first end 114 (e.g., clockwise in FIG. 1A) along the arc 118 to decrease the amount of the pledged contribution. In this case, user device A may update the field(s) showing the pledged contribution for user A to show the amount change as user A slides the slidable element along the arc 118.

Based on the user interaction indicating the first point 150 on the arc-shaped element 112, user device A may present the first arc portion 152 on the UI in a different visual manner than the second arc portion 126, and/or one or more other arc portions, such as the differential portion 132. For example, user device A may present the first arc portion 152 on the UI using a first visual attribute, and user device A may present the second arc portion 126 on the UI using a second visual attribute that is different from the first visual attribute. As shown in FIG. 1C, the differential arc portion 132 spans from the first point 150 to the second point 126 and represents a difference between the total amount for the goal and a sum of a first contribution amount for user A and a second contribution amount for user B. The UI may present the differential arc portion 132 using a third visual attribute that is different from both the first visual attribute and the second visual attribute.

In some implementations, the second arc portion 126 representing the pledged contribution for user B may not be editable via user interaction when the UI is associated with the user account of user A (e.g., when user A is logged in). In some implementations, the account management device, based on receiving and verifying the user credential associated with user A, may transmit information that indicates an end or a side of the arc-shaped element that is associated with user A. For example, the information may indicate that the first end 114 of the arc-shaped element is associated with user A. The information may be included in the UI configuration information. In this case, the UI configuration information may cause user device A to allow user A to interact with the side or end of the arc-shaped element associated with user A and prevent user A from interacting with the side or end of the arc-shaped element not associated with user A. Similarly, the account management device may transmit, to user device B, information that indicates an end or a side that is associated with user B (e.g., the second end 116) based on receiving and verifying the user credential associated with user B.

As shown in FIG. 1D, and by reference number 158, user device A may transmit, to the account management device, information that identifies the pledged contribution amount for user A. For example, user device A may transmit the information to the account management device based on detecting a user interaction with a UI element on the UI. As shown by reference number 160, the account management device may store the information that identifies the pledged contribution amount for user A in a data structure, such as the data structure described above in connection with FIG. 1B.

Figure 1E:
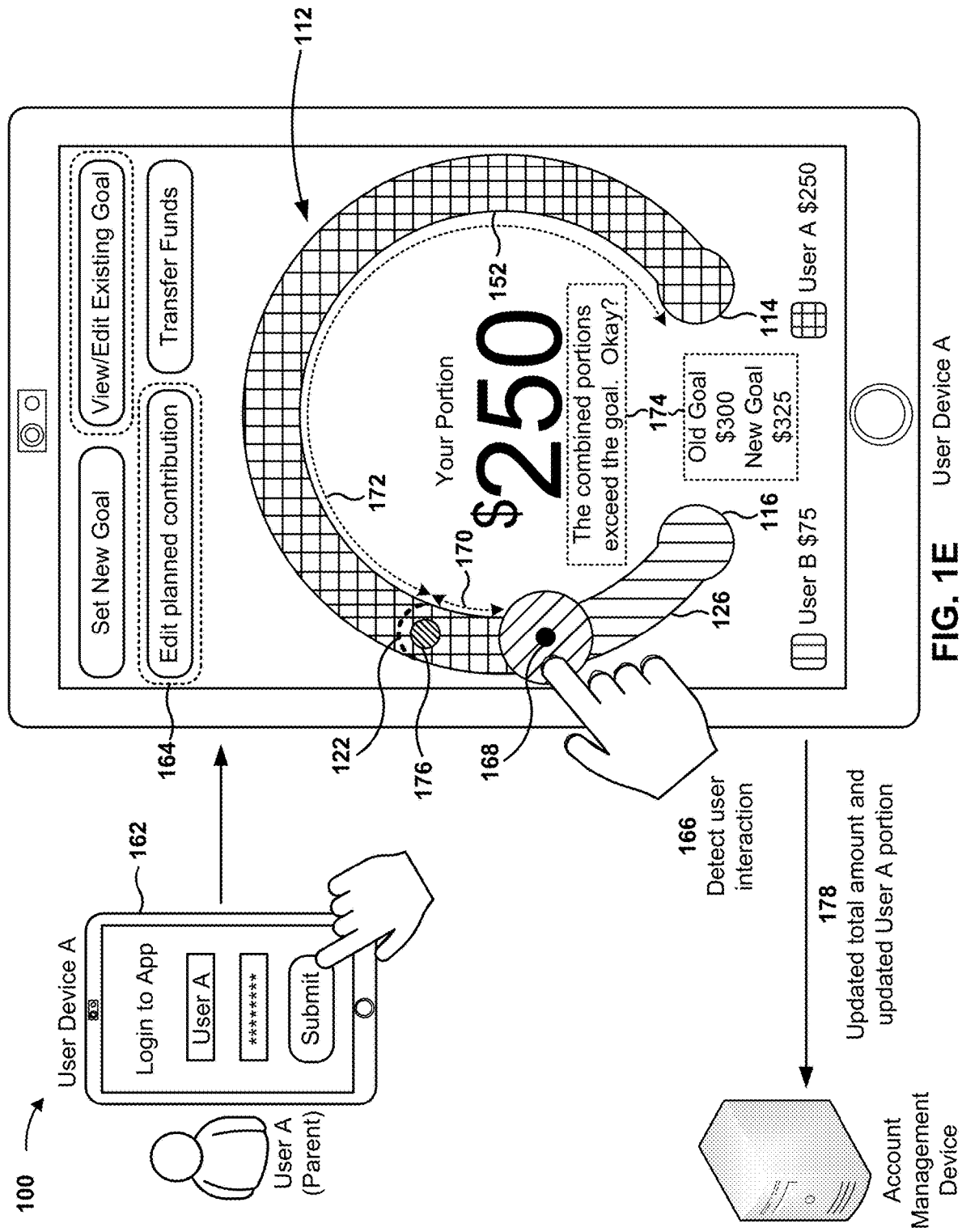

As shown in FIG. 1E, and by reference number 162, user A may interact with user device A to login to the application associated with the joint account, as described elsewhere herein. User device A may present the UI including the arc-shaped element 112. As shown by reference number 164, the UI may include an "Edit Planned Contribution" mode or UI, in which user A may edit a previously stored pledged contribution amount for user A via the UI. In some implementations, the UI may enter the "Edit Planned Contribution" mode based on user device A detecting a user selection of a selectable UI element in the UI. In some implementations, the "Edit Planned Contribution" mode may be a sub-mode of the "View/Edit Existing Goal" mode. In this case, the UI may present the selectable UI element for entering the "Edit Planned Contribution" while in the "View/Edit Existing Goal" mode. Although operations described in connection with FIG. 1E are described in connection with the "Edit Planned Contribution" mode and in connection with User A, one or more of these operations may be performed in connection with the "View/Edit Existing Goal" mode (described above in connection with FIG. 1C) and/or in connection with User B.

As further shown in FIG. 1E, and by reference number 166, user device A may detect a user interaction that indicates an adjusted first point 168 on the arc-shaped element 112. For example, user A may interact with the slidable UI element described above to adjust the pledged contribution amount for user A. User device A may update the first arc portion 152 based on the adjusted first point 168 and determine the adjusted pledged contribution amount for user A based on the length of the updated first arc portion 152. In some implementations, user device A may detect that the updated first arc portion 152 overlaps with the second arc portion 126. For example, user device A may detect that the adjusted first point 168 indicated by the user interaction is located closer to the second end 116 of the arc-shaped element than is the second point 122 (e.g., a distance between the adjusted first point 168 and the second end 116 is smaller than a distance between the second point 122 and the second end 116). In this case, the updated first arc portion 152 may include a portion 170 of the second arc portion 126 between the first point 168 and the second point 122, and may also include an entirety 172 of the arc 118 other than the second arc portion 126 (e.g. a portion of the arc 118 between the second point 122 and the first end 114).

Based on detecting that the updated first arc portion 152 overlaps with the second arc portion 126, user device A may determine that the sum of the adjusted pledged contribution amount for user A, represented by the updated first arc portion 152, and the pledged contribution amount for user B, represented by the second arc portion 126, exceeds the total joint contribution amount. For example, as shown in FIG. 1E, the adjusted contribution amount for user A is $250, the contribution amount for user B is $75, and the sum of the contribution amounts for user A and user B ($325) exceeds the total amount of $300 for the goal. As shown by reference number 174, in some implementations, user device A may update the total amount for the goal and present the updated total amount on the UI. For example, user device A may update the total amount for the goal to an updated joint pledge contribution amount that is the sum of the pledged contribution amounts for user A and user B (e.g., $325 in FIG. 1E). Alternatively, user device A may maintain the prior total amount for the goal, and may provide an indication of an additional amount beyond the total amount. Referring to the example of FIG. 1E, user device A may indicate that the total amount for the goal is still $300, and that there is an additional amount of $25. The additional amount may be used toward the goal or may be reallocated to a different goal. In this example, user device A may indicate the total amount and the additional amount, such as "Total Goal: $300+$25 Extra."

In some implementations, user device A may present, on the UI and/or on the arc-shaped element, an indication that the sum of the pledged contribution amounts exceeds the total amount for the goal. For example, user device A may present the updated first arc portion 152, including the portion 170, on the UI using the first visual attribute associated with the first arc portion 152. In some implementations, user device A may present a visual marking 176, on the arc 118 (e.g., on the arc-shaped element), representing the second point 122 in order to visualize the amount of overlap between the updated first arc portion 152 and the second arc portion 126.

In some implementations, user device A may display a prompt asking user A to confirm the selection of the adjusted first point 168 in a case in which the sum of the pledged contribution amounts exceeds the total amount for the goal. In this case, user device A may change the total amount for the goal to an updated total amount (e.g., an updated joint pledged contribution) based on receiving a user input that confirms the selection. In some implementations, user device A may initially present the updated arc portion 152 on the UI as an arc portion spanning from the first end 114 to the second point 122, and may then present the updated first arc portion 152 including the portion 170 (e.g., between the first point 168 and the second point 122) and the entirety 172 of the arc 118 other than the second arc portion 126 based on receiving the user input that confirms the selection. In some implementations, user device A may present the updated first arc portion 152 on the UI using the first visual attribute associated with the first arc portion 152. As further shown, user device A may present the visual marking 176 representing the second point 122 using a visual attribute that is different from the first visual attribute. In some implementations, user device A may present the visual marking 176 using the second visual attribute used for the second arc portion 126 to indicate that the visual marking 176 indicates the second point 122 that is at an end of the second arc portion 126. Alternatively, user device A may present the first arc portion 152 using a first visual attribute, may present the second arc portion 126 using a second visual attribute, and may present the visual marking 176 using a third visual attribute.

In some implementations, the UI may not permit the combined pledged contribution amounts for user A and user B to exceed to the total amount for the goal. In this case, user device A, based on detecting that the adjusted first point 168 is located closer to the second end 116 than is the second point 122, may set the adjusted first point 168 to the same point as the second point 122. That is, user device A may set the pledged contribution amount for user A to be equal to a difference between the total amount for the goal (e.g., the joint pledged contribution) and the pledged contribution amount for user B.

As further shown in FIG. 1E, and by reference number 178, user device A may transmit, to the account management device, the updated pledged contribution amount for user A. In some implementations, user device A may transmit, to the account management device, the updated total amount for the goal in cases in which the adjustment to the updated pledged contribution amount for user A results in updating the total amount for the goal.

Figure 1F:
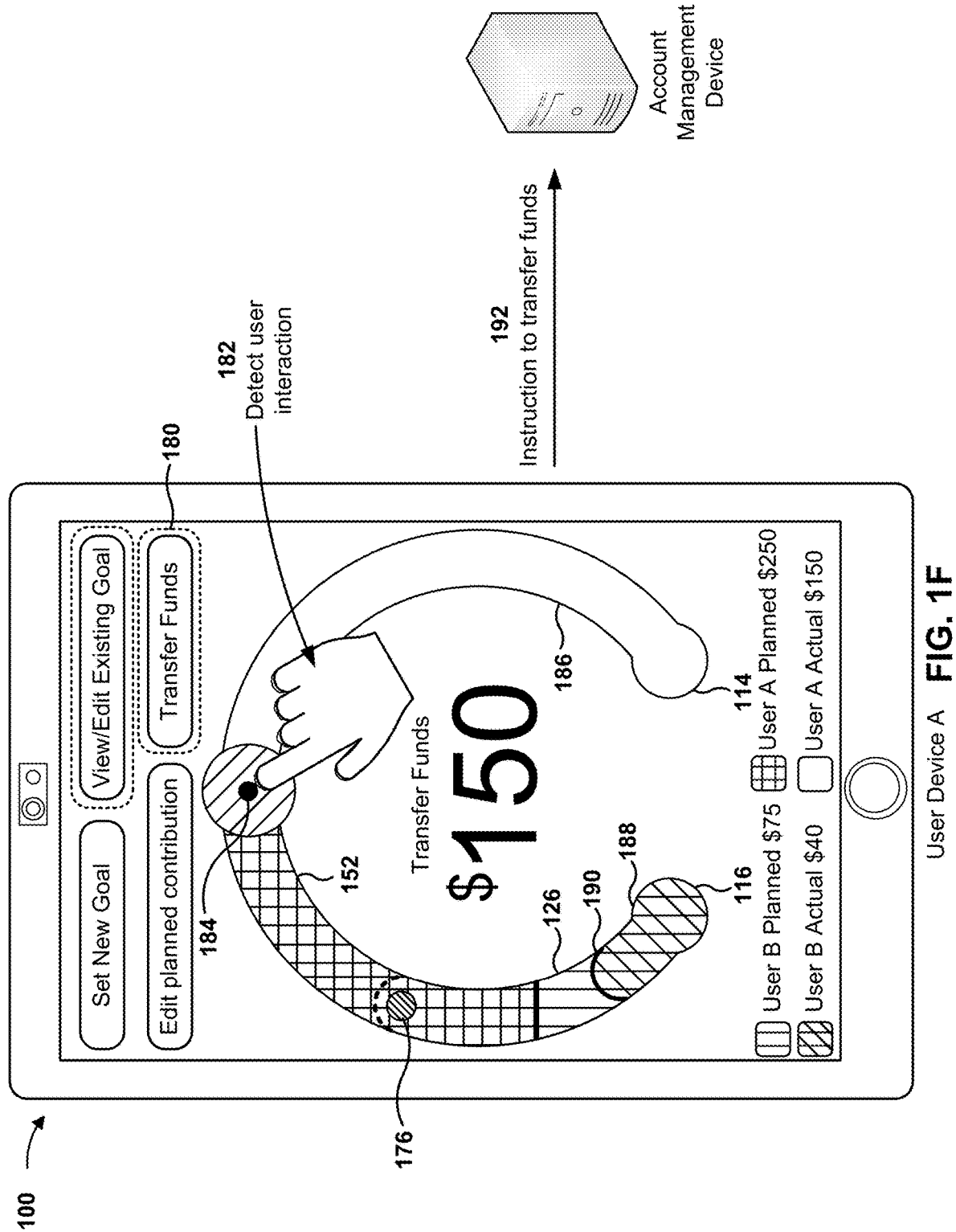

As shown in FIG. 1F, and by reference number 180, the UI may include a "Transfer Funds" mode or UI in which a user may indicate an actual amount to contribute from a financial account associated with the user. As shown by reference number 182, user device A may detect a user interaction that indicates a third point 184 on the first arc portion 152. As further shown, a third arc portion spanning 186 from the first end 114 to the third point 184 may represent the actual amount, of the pledged contribution amount for user A, contributed to the total goal amount from the financial account associated with user A. By indicating the third point 184 and setting the third arc portion 186, user A may indicate, via the UI, an amount to be transferred from the financial account associated with user A. For example, as shown in FIG. 1F, the actual amount to be transferred from the financial account associated with user A is $150. The UI may present the third arc portion 186 in a visual manner different from the first arc portion 152 (e.g., a remaining portion of the first arc portion 152 that represents a pledged, but not contributed, amount). For example, the UI may present the third arc portion 186 using a third visual attribute that is different from the first visual attribute associated with the first arc portion 152. The third visual attribute may also be different from the second visual attribute associated with the second arc portion 126, a visual attribute associated with a differential arc portion, and/or a visual attribute associated with the visual marking 176.

User B may indicate, via the UI, an amount to transfer from a financial account associated with user B similarly to as described above for user A. As shown, user device A may present, on the UI, a fourth arc portion 188 spanning from the second end 116 to a fourth point 190 (or area, part, or the like) of the second arc portion 126. The fourth arc portion 188 represents an actual amount contributed to the total amount for the goal from the financial account associated with user B. The UI may present the fourth arc portion 188 using a fourth visual attribute that is different from the second visual attribute associated with the second arc portion 126. The fourth visual attribute may also be different from the first visual attribute associated with the first arc portion 152, the third visual attribute associated with the third arc portion 186, the visual attribute associated with the differential arc portion, and/or the visual attribute associated with the visual marking 176.

As further shown in FIG. 1F, and by reference number 192, user device A may transmit, to the account management device, an instruction to transfer funds from the financial account associated with user A. User device A may transmit the instruction to transfer the amount represented by the third arc portion 186 of the UI (e.g., $150 in FIG. 1F) based on detecting the user interaction setting the amount to be transferred. The instructions to transfer the funds may include instructions to transfer the funds from the financial account associated with user A to the joint account for user A and user B or to transfer the funds to the financial account associated with user B.

As described above, user A may be a parent and user B may be a child. In some implementations, the UI presented on user device A may include a selectable field, such as a check box, that the parent may select to indicate that the remaining/outstanding portion of the parent's contribution (or user A's contribution) be auto-transferred to the account associated with the child (or user B) or the joint account when the child (or user B) reaches their pledged contribution. In this case, when the field is selected, user device A or user device B may automatically transmit an instruction to transfer the remaining funds for the parent's contribution (or user A's contribution) based on a determination that the actual contribution from the child (or user B) is equal to the pledged contribution from child (or user B).

Although implementations are described herein in connection with presentation and control of user interaction with an arc-shaped UI element, techniques described herein may be used for presentation and control of user interaction with UI elements having other shapes. For example, in some implementations, the UI element may have a vertical line or bar shape, a horizontal line or bar shape, or another shape. In some implementations, the UI element may have two ends and a connector portion spanning between the two ends. Respective portions (e.g., first and second portions) spanning from each of the two ends may represent the respective contributions of two users. Other portions of the UI element (e.g., a third portion, a fourth portion, and/or a differential portion) may be used similarly to in the implementations described above. Using the techniques described herein, a user device may present, on a UI, an arc-shaped UI element (or a UI element with another shape) that provides user-friendly visualization and editing of the individually pledged contributions of two users and the progress of the users toward a shared goal.

As indicated above, FIGS. 1A-1F are provided as an example. Other examples may differ from what is described with regard to FIGS. 1A-1F.

Figure 2:
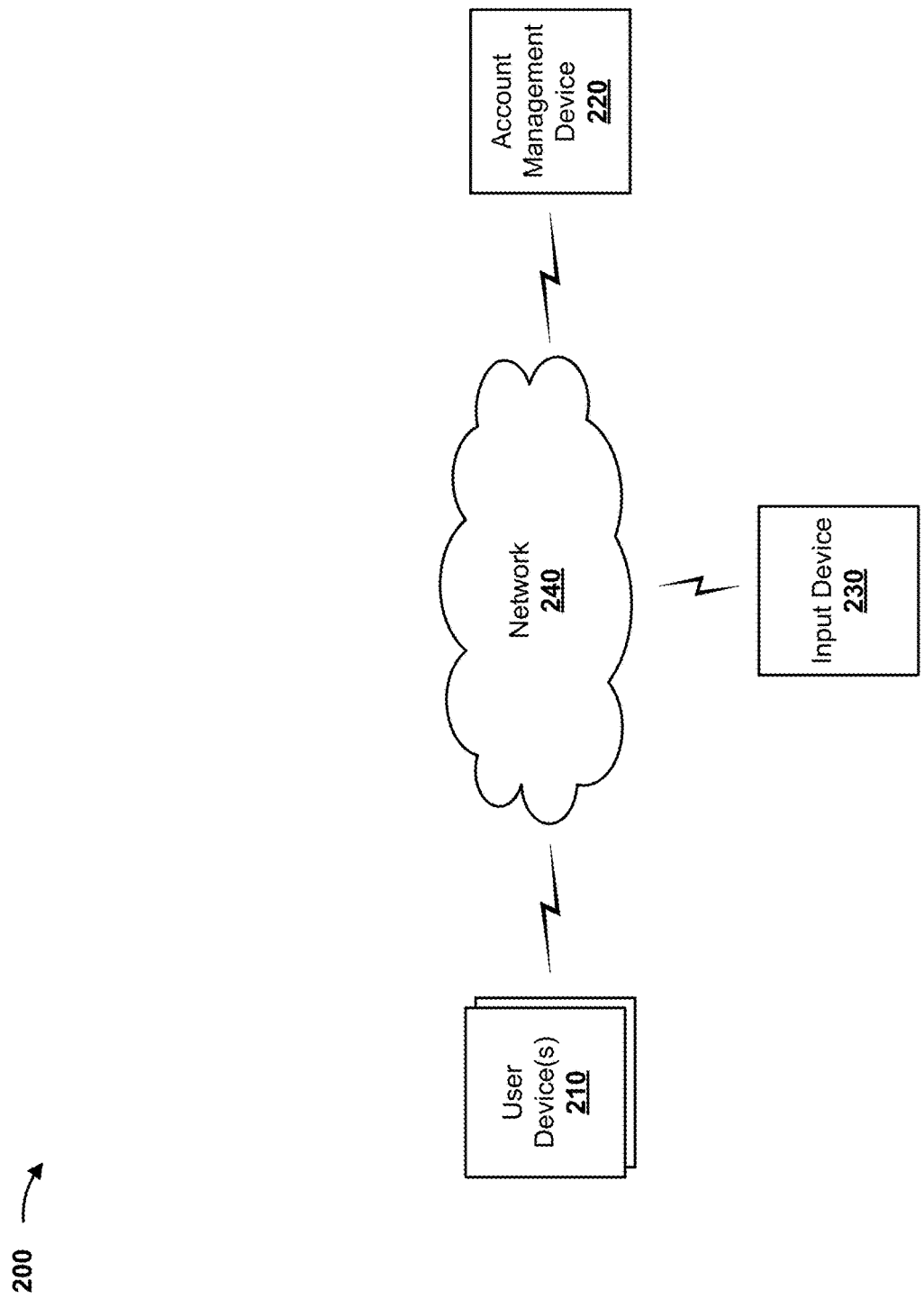
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more user devices 210, an account management device 220, an input device 230, and a network 240. Devices of environment 200 may interconnect via wired connections, wireless connections, or a combination of wired and wireless connections.

The user device(s) 210 includes one or more devices capable of receiving, generating, storing, processing, and/or providing information associated with presentation of and control of user interaction with an arc-shaped UI element, as described elsewhere herein. The user device(s) 210 may include a communication device and/or a computing device. For example, the user device(s) 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The account management device 220 includes one or more devices capable of receiving, generating, storing, processing, providing, and/or routing information associated with presentation of and control of user interaction with an arc-shaped UI element, as described elsewhere herein. The account management device 220 may include a communication device and/or a computing device. For example, the account management device 220 may include a server, such as an application server, a client server, a web server, a database server, a host server, a proxy server, a virtual server (e.g., executing on computing hardware), or a server in a cloud computing system. In some implementations, the server device 220 includes computing hardware used in a cloud computing environment. In some implementations, the account management device 220 stores information associated with a financial account, such as a bank account, a credit account, or the like.

The input device 230 includes one or more devices capable of receiving, generating, storing, processing, and/or providing information associated with creating or modifying a user account, as described elsewhere herein. The input device 230 may include a communication device and/or a computing device. For example, the input device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the input device 230 and the user device 210 may be the same device. For example, the input device 230 may be a user device associated with user A (e.g., user device A), a user device associated with user B (e.g., user device B), as described elsewhere herein.

The network 240 includes one or more wired and/or wireless networks. For example, the network 240 may include a cellular network, a public land mobile network, a local area network, a wide area network, a metropolitan area network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
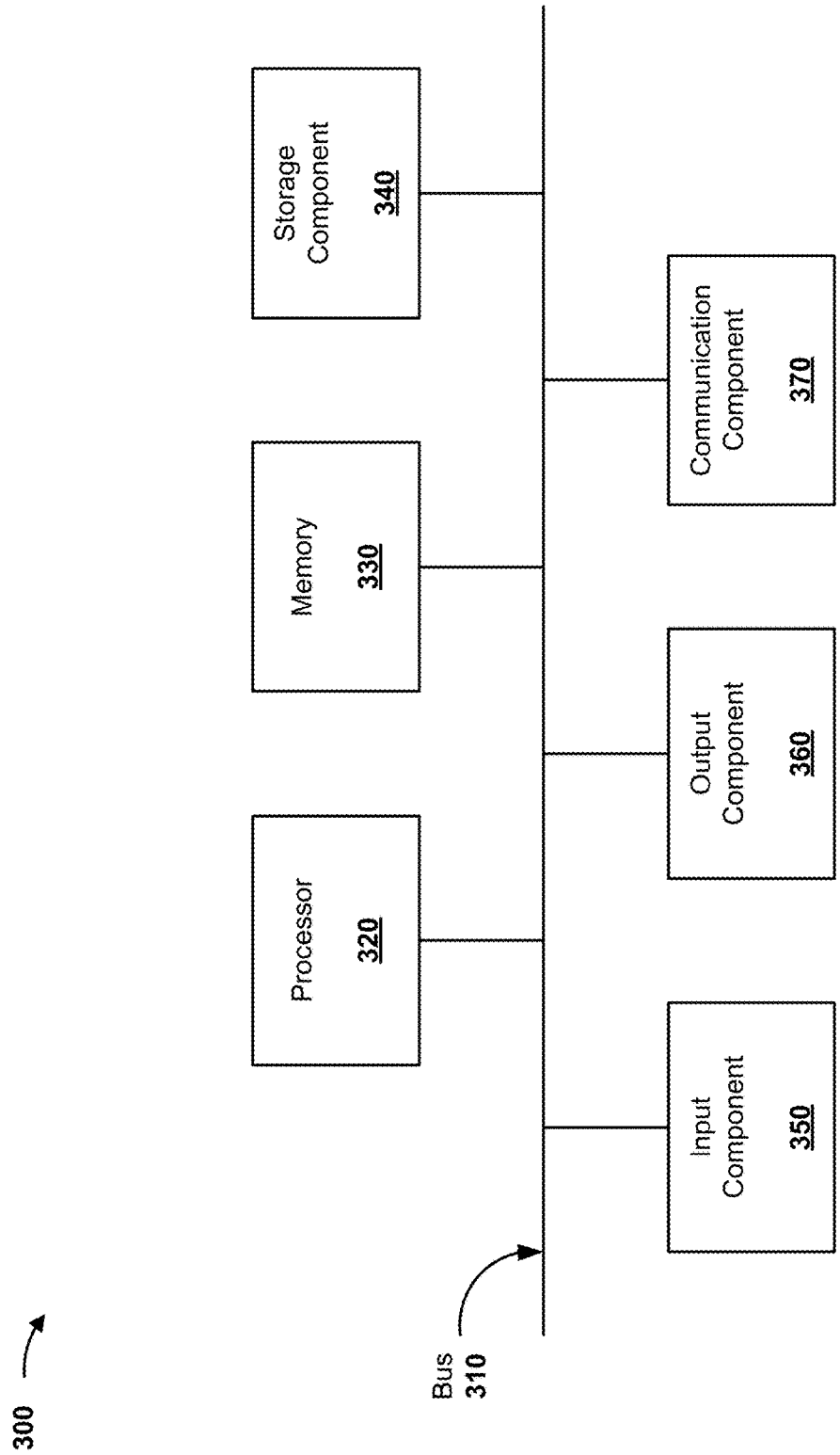
FIG. 3 is a diagram of example components of one or more devices of FIG. 2.

FIG. 3 is a diagram of example components of a device 300, which may correspond to the user device(s) 210, the account management device 220, and/or the input device 230. In some implementations, the user device(s) 210, the account management device 220, and/or the input device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
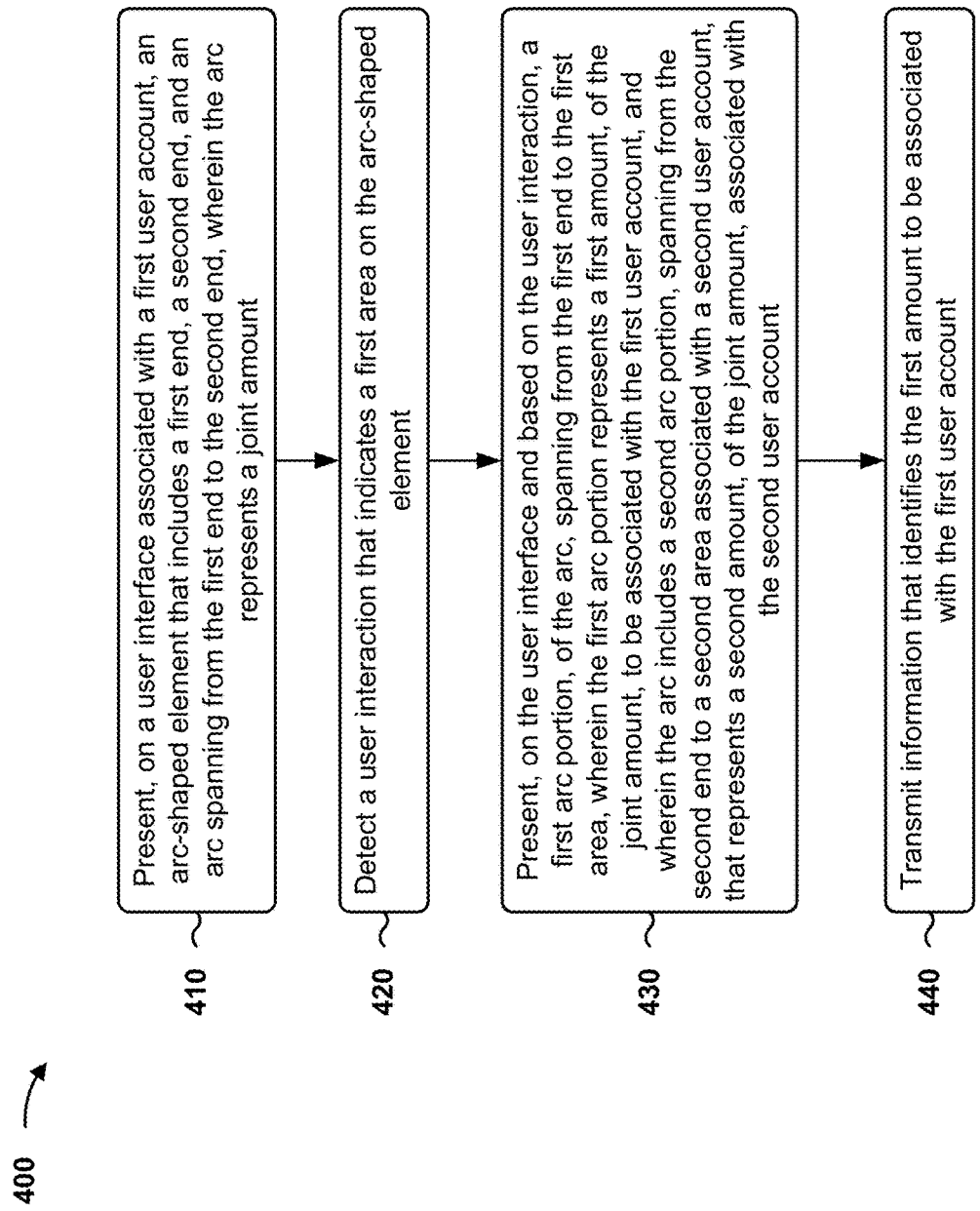
FIG. 4 is a flowchart of an example process relating to presentation and control of user interaction with an arc-shaped user interface element.

FIG. 4 is a flowchart of an example process 400 associated with presentation of and control of user interaction with an arc-shaped user interface element. In some implementations, one or more process blocks of FIG. 4 may be performed by a user device (e.g., user device 210). In some implementations, one or more process blocks of FIG. 4 may be performed by another device or a group of devices separate from or including the user device, such as account management device 220 and/or input device 230. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include presenting, on a user interface associated with a first user account, an arc-shaped element that includes a first end, a second end, and an arc spanning from the first end to the second end, wherein the arc represents a joint amount (block 410). As further shown in FIG. 4, process 400 may include detecting a user interaction that indicates a first area on the arc-shaped element (block 420). As further shown in FIG. 4, process 400 may include presenting, on the user interface and based on the user interaction, a first arc portion, of the arc, spanning from the first end to the first area, wherein the first arc portion represents a first amount, of the joint amount, to be associated with the first user account, and wherein the arc includes a second arc portion, spanning from the second end to a second area associated with a second user account, that represents a second amount, of the joint amount, associated with the second user account (block 430). As further shown in FIG. 4, process 400 may include transmitting information that identifies the first amount to be associated with the first user account (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user device, comprising:
   a memory; and
   one or more processors, communicatively coupled to the memory, configured to:
   present, on a user interface associated with a first user account, an arc-shaped element that includes a first end, a second end, and an arc spanning from the first end to the second end, wherein the arc represents an amount associated with the first user account and a second user account; and
   present, on the user interface, a first arc portion of the arc spanning from the first end to a first part, and a second arc portion spanning from the second end to a second part, of the arc-shaped element, wherein the first arc portion represents a first amount, of the amount, to be associated with the first user account, and the second arc portion represents a second amount, of the amount, associated with the second user account; and
   present, on the user interface, the first arc portion overlapping at least a portion of the second arc portion.

2. The user device of claim 1, wherein the one or more processors are further configured to:
   transmit, to an account management device, information that identifies the first amount to be associated with the first user account.

3. The user device of claim 1, wherein the one or more processors are further configured to:
   detect a user interaction, with the user device, that indicates the first part.

4. The user device of claim 1, wherein the one or more processors are further configured to:
   receive, from an account management device, information that identifies the amount.

5. The user device of claim 1, wherein the first arc portion is presented using a first visual attribute, and wherein the second arc portion is presented using a second visual attribute that is different from the first visual attribute.

6. The user device of claim 1, wherein adjusting the first amount or the second amount does not change a total size of the arc-shaped element.

7. The user device of claim 1, wherein adjusting the first amount changes the first arc portion of the arc-shaped element.

8. A method comprising:
   presenting, on a user interface associated with a first user account, an arc-shaped element that includes a first end, a second end, and an arc spanning from the first end to the second end, wherein the arc represents an amount associated with the first user account and a second user account; and
   presenting, on the user interface, a first arc portion of the arc spanning from the first end to a first part, and a second arc portion spanning from the second end to a second part, of an arc shaped element,
      wherein the first arc portion represents a first pledged amount, of the amount, to be associated with the first user account, and the second arc portion represents a second pledged amount, of the amount, associated with the second user account; and
   presenting, on the user interface, the first arc portion overlapping at least a portion of the second arc portion.

9. The method of claim 8, wherein adjusting the second pledged amount changes the second arc portion of the arc-shaped element.

10. The method of claim 8, wherein the second arc portion is not editable via user interaction with the user interface associated with the first user account.

11. The method of claim 8, further comprising:
    transmitting information that identifies the first pledged amount to be associated with the first user account.

12. The method of claim 8, wherein adjusting the first pledged amount or the second pledged amount does not change a total size of the arc-shaped element.

13. The method of claim 8, further comprising:
    determining the first pledged amount based on a length of the first arc portion, a length of the arc, and the amount, wherein a ratio of the first pledged amount to the amount is equal to a ratio of the length of the first arc portion to the length of the arc.

14. The method of claim 8, further comprising:
    receiving information that identifies the amount.

15. A non-transitory computer-readable medium storing instructions, the instructions comprising:
    one or more instructions that, when executed by one or more processors, cause the one or more processors to:
    present, on a user interface associated with a first user account, an arc-shaped element that includes a first end, a second end, and an arc spanning from the first end to the second end, wherein the arc represents an amount associated with the first user account and a second user account; and
    present, on the user interface, a first arc portion of the arc spanning from the first end to a first part, in a different visual manner than one or more other arc portions of the arc, and a second arc portion spanning from the second end to a second part, of the arc-shaped element,
       wherein the first arc portion represents a first amount, of the amount, to be associated with the first user account, and the second arc portion represents a second amount, of the amount, associated with the second user account; and present, on the user interface, the first arc portion overlapping at least a portion of the second arc portion.

16. The non-transitory computer-readable medium of claim 15, wherein the one or more instructions, when executed by the one or more processors, further cause the one or more processors to:
  detect a user interaction that indicates the first end on the arc-shaped element.

17. The non-transitory computer-readable medium of claim 15, wherein the one or more other arc portions includes a differential arc portion of the arc, spanning from the first end to the second end, that represents a difference between the amount and a sum of the first amount and the second amount.

18. The non-transitory computer-readable medium of claim 15, wherein adjusting the first amount or the second amount does not change a total size of the arc-shaped element.

19. The non-transitory computer-readable medium of claim 15, wherein the second arc portion is not editable via user interaction with the user interface associated with the first user account.

20. The non-transitory computer-readable medium of claim 15, wherein the one or more instructions, when executed by the one or more processors, further cause the one or more processors to:
  transmit a user credential associated with a first user of the first user account for authentication.

* * * * *

UNITED STATES PATENT AND TRADEMARK OFFICE
CERTIFICATE OF CORRECTION

Page 1 of 1

PATENT NO.        : 12,019,860 B2
APPLICATION NO.   : 18/048130
DATED             : June 25, 2024
INVENTOR(S)       : Zhe Liu et al.

It is certified that error appears in the above-identified patent and that said Letters Patent is hereby corrected as shown below:

In the Claims

Claim 1:
Column 15, Lines 37-38, change "a second end, and an are spanning from the first end to the second end, wherein the are represents an amount" to -- a second end, and an arc spanning from the first end to the second end, wherein the arc represents an amount --

Signed and Sealed this
Ninth Day of September, 2025

Coke Morgan Stewart
*Acting Director of the United States Patent and Trademark Office*